United States Patent
Huang

(10) Patent No.: US 8,424,559 B2
(45) Date of Patent: *Apr. 23, 2013

(54) WALL-MOUNTED FAUCET THAT IS AVAILABLE FOR WATER SUPPLY LINES OF DIFFERENT SPECIFICATIONS AND SIZES

(75) Inventor: Li-Chen Huang, Changhua Hsien (TW)

(73) Assignee: Alexander Yeh Industry Co., Ltd., Changhua Hsien (TW)

( * ) Notice: Subject to any disclaimer, the term of this patent is extended or adjusted under 35 U.S.C. 154(b) by 177 days.

This patent is subject to a terminal disclaimer.

(21) Appl. No.: 13/093,094

(22) Filed: Apr. 25, 2011

(65) Prior Publication Data

US 2012/0266993 A1 Oct. 25, 2012

(51) Int. Cl.
*F16L 5/00* (2006.01)

(52) U.S. Cl.
USPC ............... 137/360; 137/359; 137/801; 4/678; 251/322

(58) Field of Classification Search ............ 251/322, 251/323, 319, 320, 321, 339, 155; 137/119.05, 137/119.03, 119.08, 467, 801, 359, 360; 4/678, 675; 239/600

See application file for complete search history.

(56) References Cited

U.S. PATENT DOCUMENTS

| | | | |
|---|---|---|---|
| 3,779,278 A * | 12/1973 | Hill | 137/597 |
| 6,334,463 B1 * | 1/2002 | Lee | 137/801 |
| 6,840,267 B1 * | 1/2005 | Jennings et al. | 137/360 |
| 7,373,674 B1 * | 5/2008 | Condon | 4/678 |
| 7,857,286 B1 * | 12/2010 | Huang | 251/322 |

* cited by examiner

*Primary Examiner* — John K Fristoe, Jr.
*Assistant Examiner* — Marina Tietjen
(74) *Attorney, Agent, or Firm* — Alan Kamrath; Kamrath IP Lawfirm, P.A.

(57) ABSTRACT

A faucet includes a faucet body, a connecting member mounted in the faucet body, a control valve mounted between the faucet body and the connecting member, a plurality of elastic plates each connected between the faucet body and the connecting member, a first connector selectively connected with the connecting member, and a second connector selectively connected with the connecting member. Thus, the connecting member is connected with a water supply line by the first connector or the second connector so that the faucet is available for water supply lines of different types and sizes.

15 Claims, 7 Drawing Sheets

WALL-MOUNTED FAUCET THAT IS AVAILABLE FOR WATER SUPPLY LINES OF DIFFERENT SPECIFICATIONS AND SIZES

BACKGROUND OF THE INVENTION

1. Field of the Invention

The present invention relates to a faucet and, more particularly, to a wall-mounted faucet.

2. Description of the Related Art

A conventional faucet comprises a faucet body, a connecting member mounted in the faucet body and connected with a water supply line to introduce water from the water supply line into the faucet body, and a control valve mounted between the faucet body and the connecting member to switch a connection between the faucet body and the connecting member so as to open or close the water flow from the connecting member to the faucet body. The water supply line is mounted in the wall of a house. The connecting member is connected with the faucet body by screws. However, the connecting member is only available for the water supply line with a single size and cannot fit another water supply line with a different size and type, thereby limiting the versatility of the faucet. In addition, the connecting member is connected with the faucet body by multiple screws, so that the faucet is not assembled easily and quickly, thereby causing inconvenience to a user in assembly of the faucet. Further, the screws are rusted by water or moisture during a long-term utilization so that the screws will be corroded or jammed and cannot be loosened or unscrewed easily and quickly, thereby greatly causing difficulty in maintenance and replacement of the faucet.

BRIEF SUMMARY OF THE INVENTION

In accordance with the present invention, there is provided a faucet, comprising a faucet body, a connecting member mounted in the faucet body, a control valve mounted between the faucet body and the connecting member, a plurality of elastic plates each connected between the faucet body and the connecting member, a first connector selectively connected with the connecting member, and a second connector selectively connected with the connecting member. The faucet body has an inner portion provided with a receiving chamber. The faucet body has a first end provided with an opening, a mediate portion provided with a conduit and a second end provided with an outlet port and a through hole. The connecting member is received in the receiving chamber of the faucet body. The connecting member has a first end connected with a disk which is located in the opening of the faucet body to seal the opening of the faucet body. The disk is provided with a mounting sleeve. The mounting sleeve of the disk has an inner portion provided with a mounting hole. The connecting member has a second end provided with a reduced mounting tube which is connected with an extension sleeve which is connected with the conduit of the faucet body. The first connector is removably mounted in the mounting hole of the mounting sleeve. The second connector is removably mounted in the mounting hole of the mounting sleeve.

The primary objective of the present invention is to provide a wall-mounted faucet that is available for water supply lines of different specifications and sizes.

According to the primary advantage of the present invention, the connecting member is connected with the water supply line by the first connector or the second connector so that the faucet is available for water supply lines of different types and sizes to enhance the versatility and compatibility of the faucet.

According to another advantage of the present invention, the connecting member is combined with the faucet body by elastic connection of the elastic plates so that the connecting member is repaired and replaced easily and quickly.

According to a further advantage of the present invention, the water-tight gasket is biased between the through hole of the faucet body and the valve shaft of the control valve, and the O-rings are biased between the water-tight gasket and the valve shaft, so that the water-tight gasket co-operates with the O-rings to provide a sealing effect so as to prevent the water from flowing along and leaking from the valve shaft of the control valve and the through hole of the faucet body.

According to a further advantage of the present invention, the extension sleeve is connected with the connecting member to fit the length of the faucet body so that the connecting member is combined with the faucet body easily and quickly by connection of the extension sleeve.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
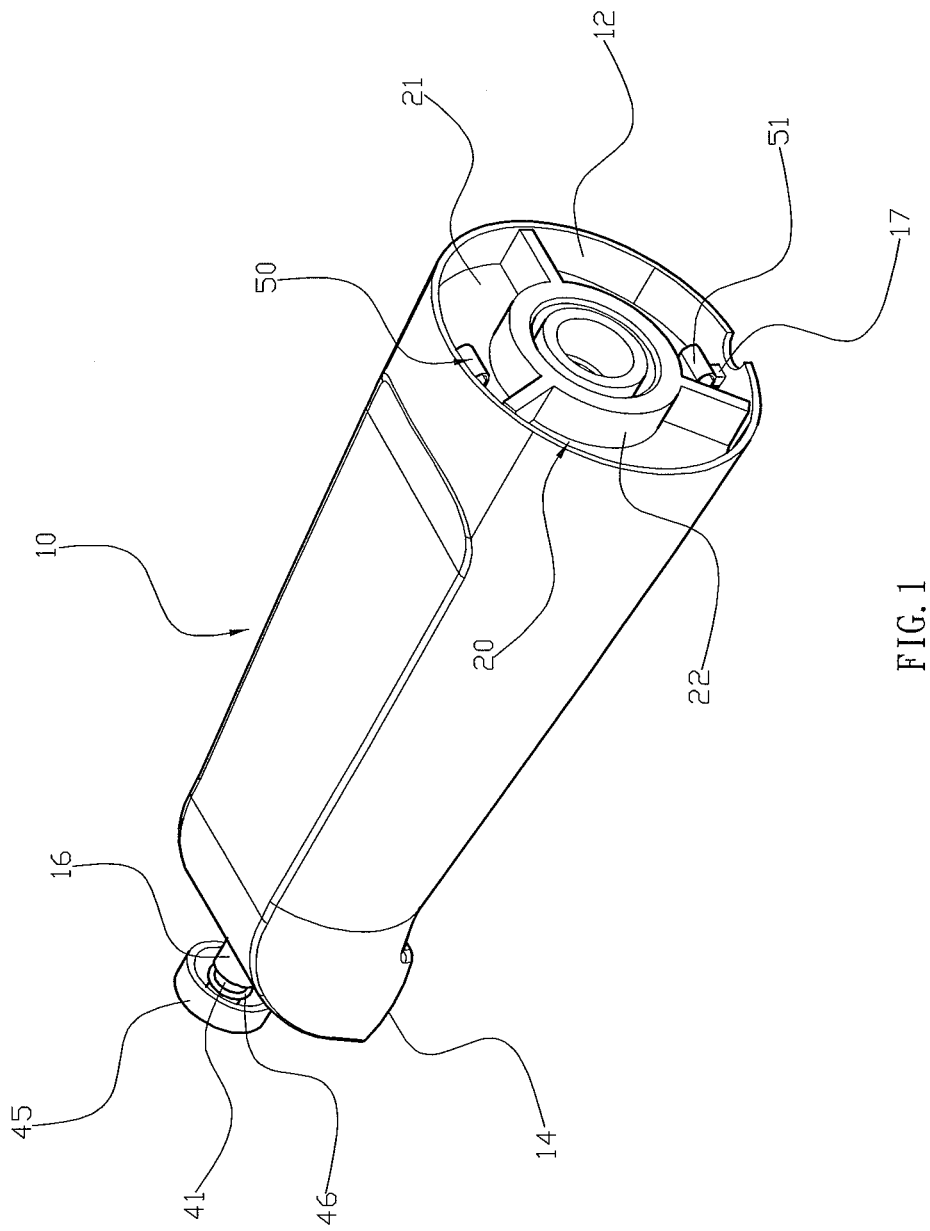
FIG. 1 is a perspective view of a faucet in accordance with the preferred embodiment of the present invention.
Figure 2:
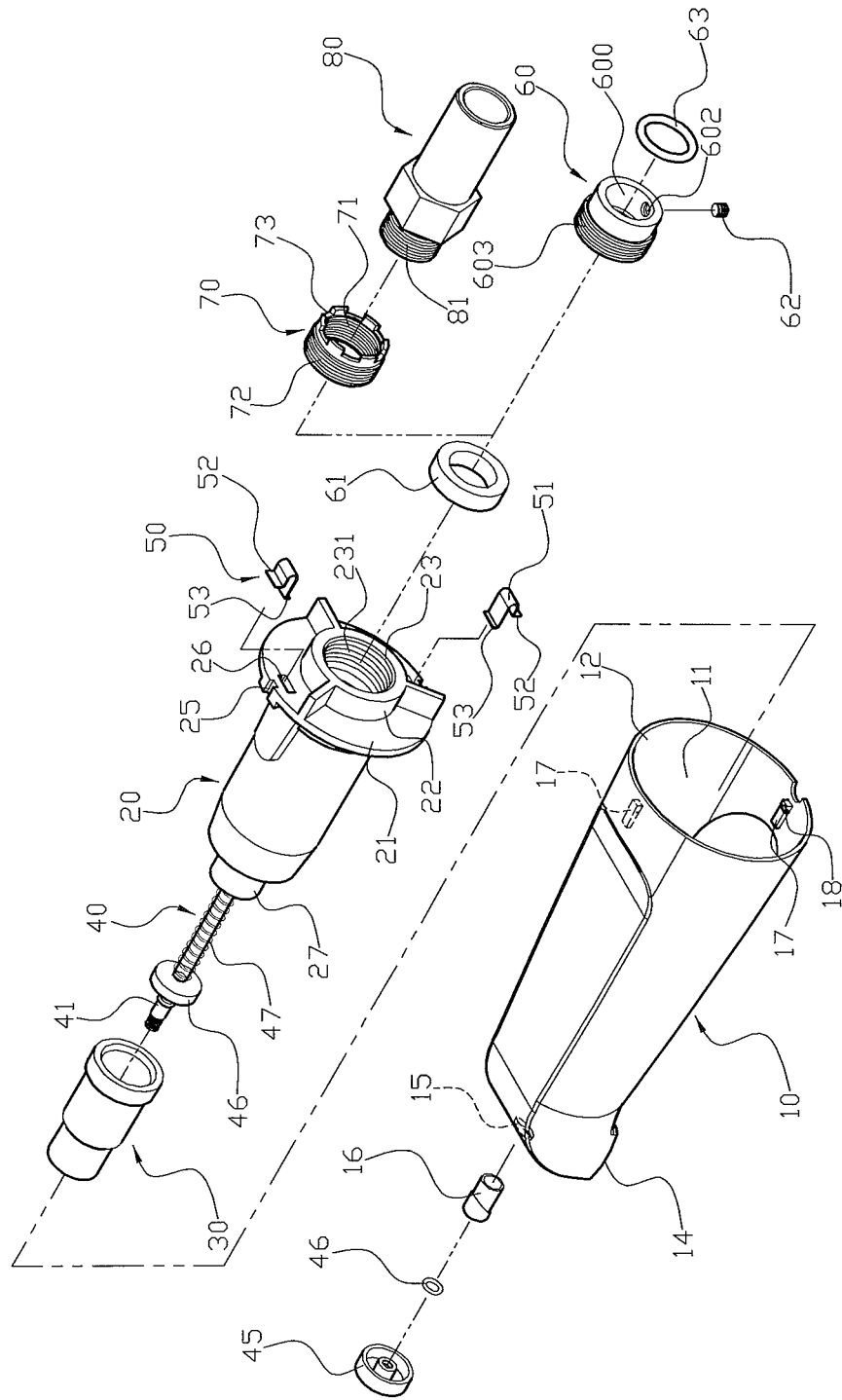
FIG. 2 is an exploded perspective view of the faucet as shown in FIG. 1.
Figure 3:
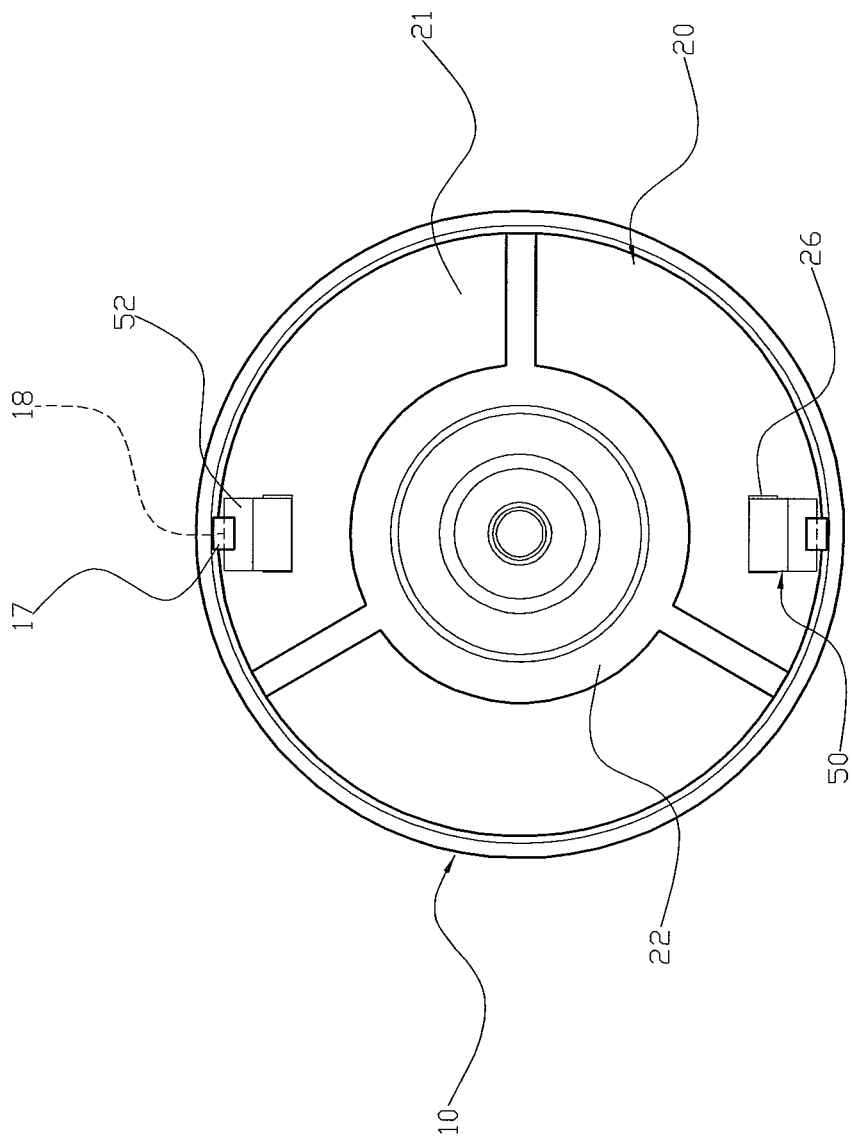
FIG. 3 is a side view of the faucet as shown in FIG. 1.

Referring to the drawings and initially to FIGS. 1-5, a faucet in accordance with the preferred embodiment of the present invention comprises a hollow faucet body 10, a connecting member 20 mounted in the faucet body 10, a control valve 40 mounted between the faucet body 10 and the connecting member 20, a plurality of elastic plates 50 each connected between the faucet body 10 and the connecting member 20, a first connector 60 selectively connected with the connecting member 20, and a second connector 70 selectively connected with the connecting member 20.

The faucet body 10 has an inner portion provided with a receiving chamber 11. The faucet body 10 has a first end provided with an opening 12, a mediate portion provided with a conduit 13 and a second end provided with an outlet port 14 and a through hole 15. The receiving chamber 11 of the faucet body 10 is connected between the opening 12 and the conduit 13 of the faucet body 10 and has a peripheral wall provided with a plurality of retaining blocks 17. Each of the retaining blocks 17 of the faucet body 10 is located beside the opening 12 of the faucet body 10 and has a face provided with a locking slit 18. Each of the retaining blocks 17 of the faucet body 10 extends in an axial direction of the faucet body 10, and the locking slit 18 of each of the retaining blocks 17 extends in a direction that is perpendicular to each of the retaining blocks 17. The conduit 13 of the faucet body 10 is connected between the receiving chamber 11 and the outlet port 14 of the faucet body 10 and between the receiving chamber 11 and the through hole 15 of the faucet body 10. The through hole 15 of the faucet body 10 is connected to the outlet port 14 and the conduit 13 of the faucet body 10. The faucet further comprises a water-tight gasket 16 mounted in the through hole 15 of the faucet body 10. The water-tight gasket 16 has a first end extended into the faucet body 10 and a second end protruded outward from the through hole 15 of the faucet body 10.

The connecting member 20 is received in the receiving chamber 11 of the faucet body 10. The connecting member 20 has a first end connected with a disk 21 which is located in the opening 12 of the faucet body 10 to seal the opening 12 of the faucet body 10. The disk 21 is provided with a mounting sleeve 22 which is located at a central portion of the disk 21. The mounting sleeve 22 of the disk 21 has a first end protruded from a first side of the disk 21 and inserted into the connecting member 20 and a second end protruded from a second side of the disk 21 and exposed from the opening 12 of the faucet body 10. The mounting sleeve 22 of the disk 21 has an inner portion provided with a mounting hole 23. The mounting hole 23 of the mounting sleeve 22 has a peripheral wall provided with an internal thread 231. The disk 21 has a periphery provided with a plurality of retaining recesses 25 locked onto the retaining blocks 17 of the faucet body 10 respectively. The disk 21 has a surface provided with a plurality of elongate retaining slots 26 aligning with the retaining recesses 25. Each of the retaining slots 26 extends through a whole thickness of the disk 21. The connecting member 20 has an inner portion provided with a compartment 200 connected between the mounting hole 23 of the mounting sleeve 22 and the mounting tube 27.

The connecting member 20 has a second end provided with a reduced mounting tube 27 which is connected with an extension sleeve 30 which is connected with the conduit 13 of the faucet body 10. The extension sleeve 30 is received in the receiving chamber 11 of the faucet body 10 and is connected between the mounting tube 27 of the connecting member 20 and the conduit 13 of the faucet body 10. The extension sleeve 30 has a first end mounted on the mounting tube 27 of the connecting member 20 and a second end inserted into the conduit 13 of the faucet body 10. Thus, the extension sleeve 30 is connected with the connecting member 20 to fit the length of the faucet body 10.

The control valve 40 includes a valve shaft 41 movably mounted in the water-tight gasket 16 and having a first end 410 extended into the connecting member 20 and a second end protruded outward from the water-tight gasket 16, a plurality of O-rings 46 each mounted between the water-tight gasket 16 and the valve shaft 41, a valve seat 42 mounted on the first end 410 of the valve shaft 41, a sealing ring 43 mounted on the valve seat 42 and movable to seal the mounting tube 27 of the connecting member 20, an end stop 44 mounted on the valve seat 42, a spring 47 mounted on the valve shaft 41 and biased between the water-tight gasket 16 and the first end 410 of the valve shaft 41 to push the sealing ring 43 away from the mounting tube 27 of the connecting member 20, and a pull knob 45 mounted on the second end of the valve shaft 41 to pull the sealing ring 43 toward the mounting tube 27 of the connecting member 20. The sealing ring 43 and the end stop 44 of the control valve 40 are located at two opposite sides of the valve seat 42. The O-rings 46 of the control valve 40 have different sizes. The valve shaft 41 of the control valve 40 extends through the conduit 13 of the faucet body 10, the extension sleeve 30 and the mounting tube 27 of the connecting member 20 into the compartment 200 of the connecting member 20.

Each of the elastic plates 50 has a substantially U-shaped elastic portion 51 which has a first side provided with a first locking blade 52 snapped into and locked in the locking slit 18 of a respective one of the retaining blocks 17 of the faucet body 10 and has a second side provided with a second locking blade 53 hooked in a respective one of the retaining slots 26 of the disk 21 of the connecting member 20 so that each of the elastic plates 50 is biased between the faucet body 10 and the connecting member 20 to combine the faucet body 10 and the connecting member 20. The second locking blade 53 of each of the elastic plates 50 has a length greater than that of the first locking blade 52.

The first connector 60 is removably mounted in the mounting hole 23 of the mounting sleeve 22. The first connector 60 has a tubular shape and has an inner portion provided with a mounting bore 600, and a leakproof ring 63 is mounted in the mounting bore 600 of the first connector 60. The first connector 60 has an outer wall provided with an external thread 603 screwed into the internal thread 231 of the mounting sleeve 22. The first connector 60 has a peripheral wall provided with a screw bore 602 connected to the mounting bore 600 of the first connector 60, and a threaded pressing member 62 is screwed into the screw bore 602 of the first connector 60 and is extended into the mounting bore 600 of the first connector 60. The threaded pressing member 62 is preferably a set screw.

The second connector 70 is removably mounted in the mounting hole 23 of the mounting sleeve 22. The second connector 70 has a tubular shape. The second connector 70 has an outer wall provided with an external thread 72 screwed into the internal thread 231 of the mounting sleeve 22 and has an inner wall provided with an inner threaded portion 71. The second connector 70 has an end portion provided with a plurality of tool slots 73 to allow insertion of a hand tool, such as a driver and the like, so that the second connector 70 can be driven and rotated by the hand tool.

In the preferred embodiment of the present invention, the mounting hole 23 of the mounting sleeve 22 has a distal end provided with a reduced stop flange 24, and a spacer 61 is mounted in the mounting hole 23 of the mounting sleeve 22 and is located between the stop flange 24 of the mounting sleeve 22 and the first connector 60 or the second connector 70. The mounting sleeve 22 has a periphery provided with an extension pipe 28 which is extended into the compartment 200 of the connecting member 20. The extension pipe 28 has an inner wall provided with a plurality of engaging ribs 29 (see FIG. 5).

Figure 4:
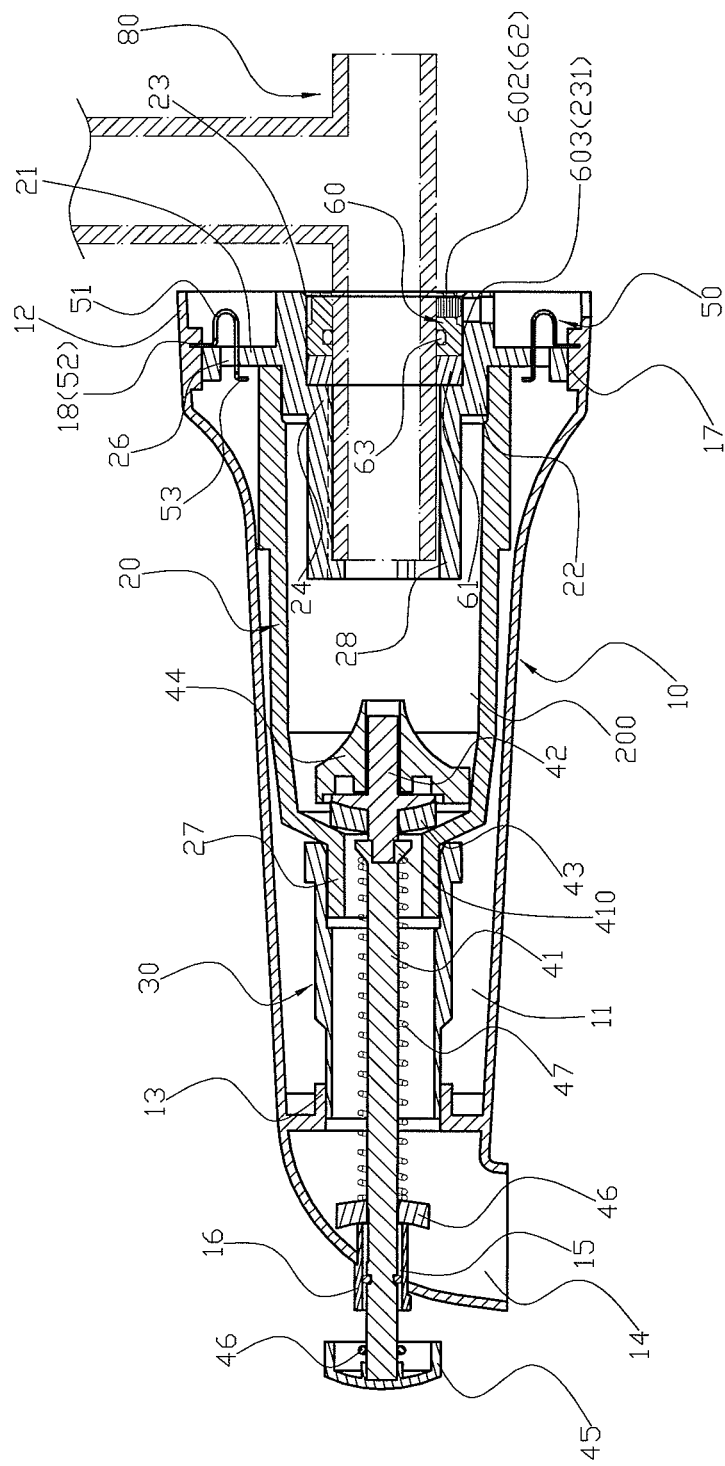
FIG. 4 is a front cross-sectional assembly view of the faucet as shown in FIG. 2.

In assembly, the first connector 60 and the second connector 70 are used to connect a water supply line 80. When the water supply line 80 is not screwed, the first connector 60 is directly mounted on an end portion of the water supply line 80, and the threaded pressing member 62 is screwed into the screw bore 602 of the first connector 60 and is extended into the mounting bore 600 of the first connector 60 to press the end portion of the water supply line 80 so that the first connector 60 is locked onto the end portion of the water supply line 80. Then, the spacer 61 is placed into the mounting hole 23 of the mounting sleeve 22, and the internal thread 231 of the mounting sleeve 22 is screwed onto the external thread 603 of the first connector 60 to connect the connecting member 20 with the water supply line 80 so that the faucet is combined with the water supply line 80 as shown in FIG. 4. At this time, the extension pipe 28 in the connecting member 20 is used to support the water supply line 80 so that the connecting member 20 is combined with the water supply line 80 solidly and stably.

Figure 5:
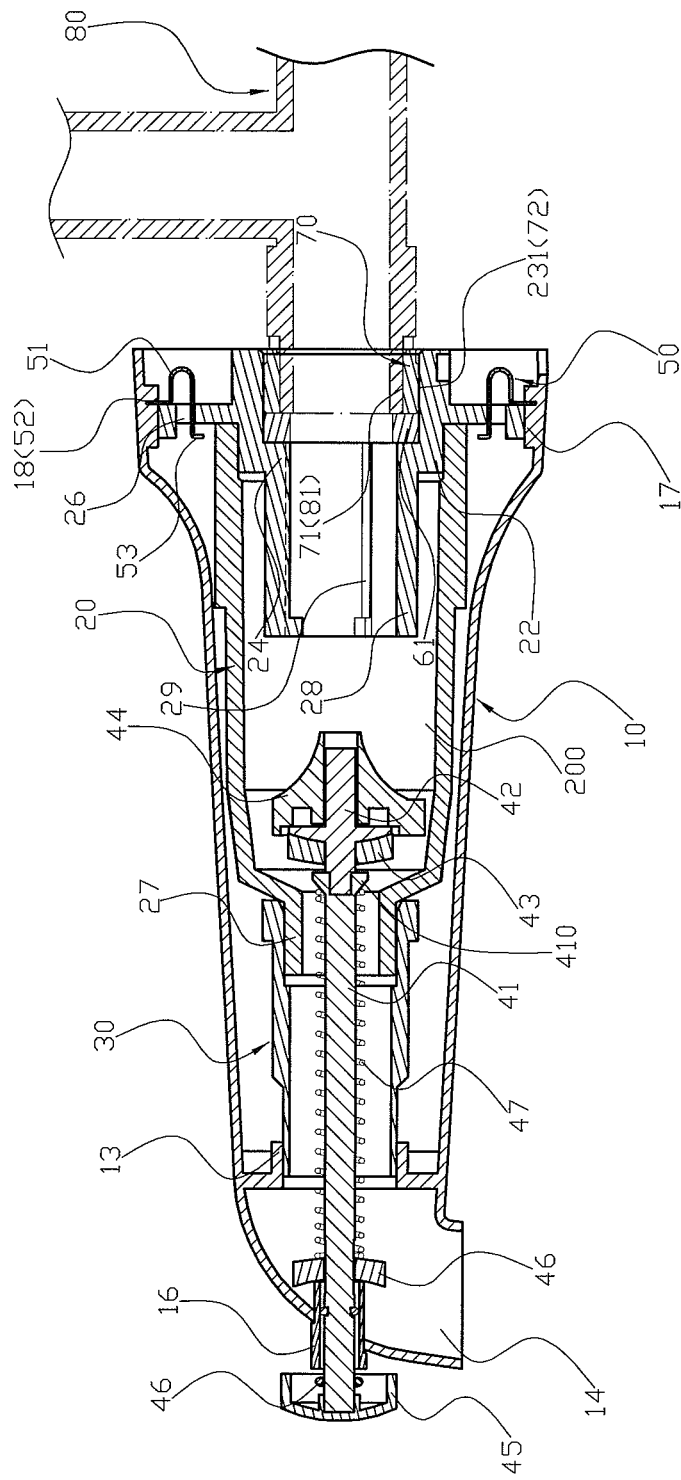
FIG. 5 is a front cross-sectional assembly view of the faucet as shown in FIG. 2.

When the end portion of the water supply line 80 is provided with an outer threaded portion 81, the external thread 72 of the second connector 70 is initially screwed into the internal thread 231 of the mounting sleeve 22 to lock the second connector 70 in the mounting sleeve 22. Then, the inner threaded portion 71 of the second connector 70 is screwed onto the outer threaded portion 81 of the water supply line 80 to lock the second connector 70 onto the water supply line 80 so as to connect the connecting member 20 with the water supply line 80 so that the faucet is combined with the water supply line 80 as shown in FIG. 5. At this time, the engaging ribs 29 of the extension pipe 28 engage the outer wall of the water supply line 80 so that the extension pipe 28 is combined with the water supply line 80 closely.

Alternatively, when the water supply line 80 has a larger diameter, the internal thread 231 of the mounting sleeve 22 is directly screwed onto the outer threaded portion 81 of the water supply line 80 to lock the mounting sleeve 22 onto the water supply line 80 so as to connect the connecting member 20 with the water supply line 80 so that the faucet is combined with the water supply line 80.

Figure 6:
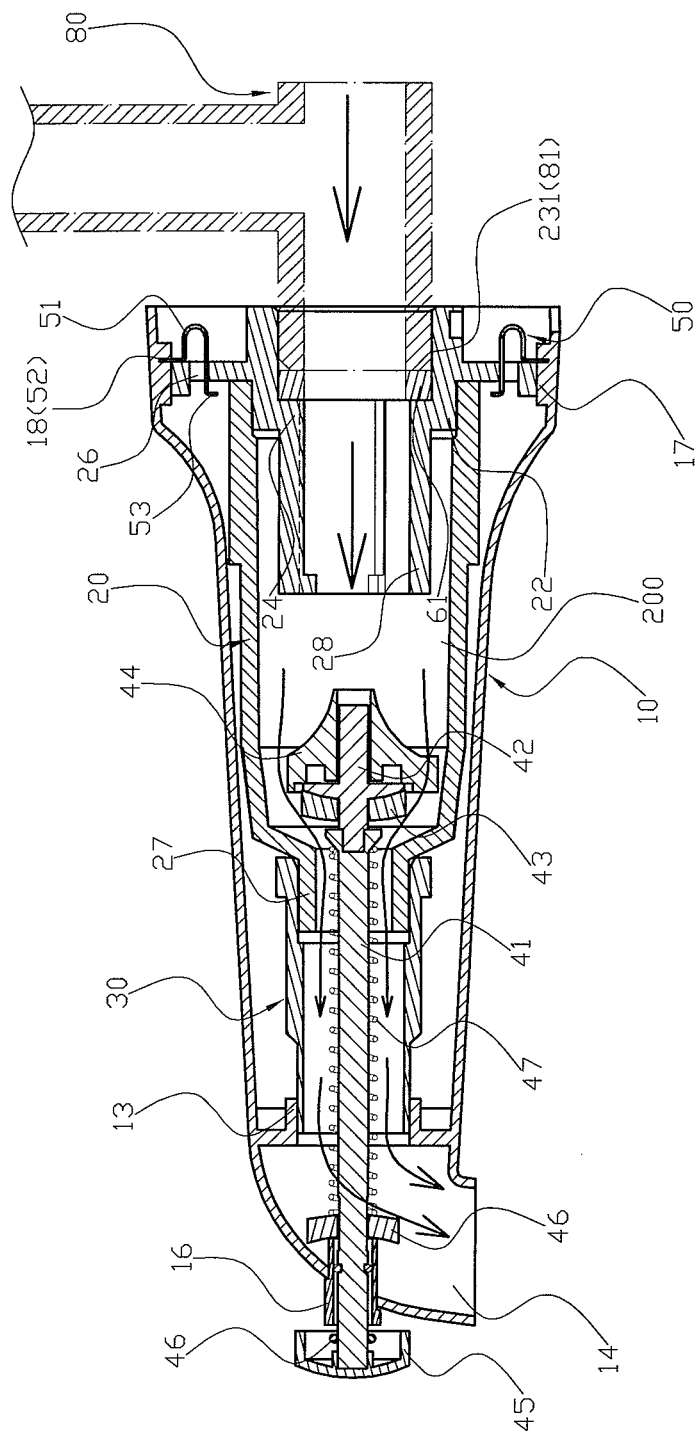
FIG. 6 is a schematic operational view of the faucet as shown in FIG. 4.
Figure 7:
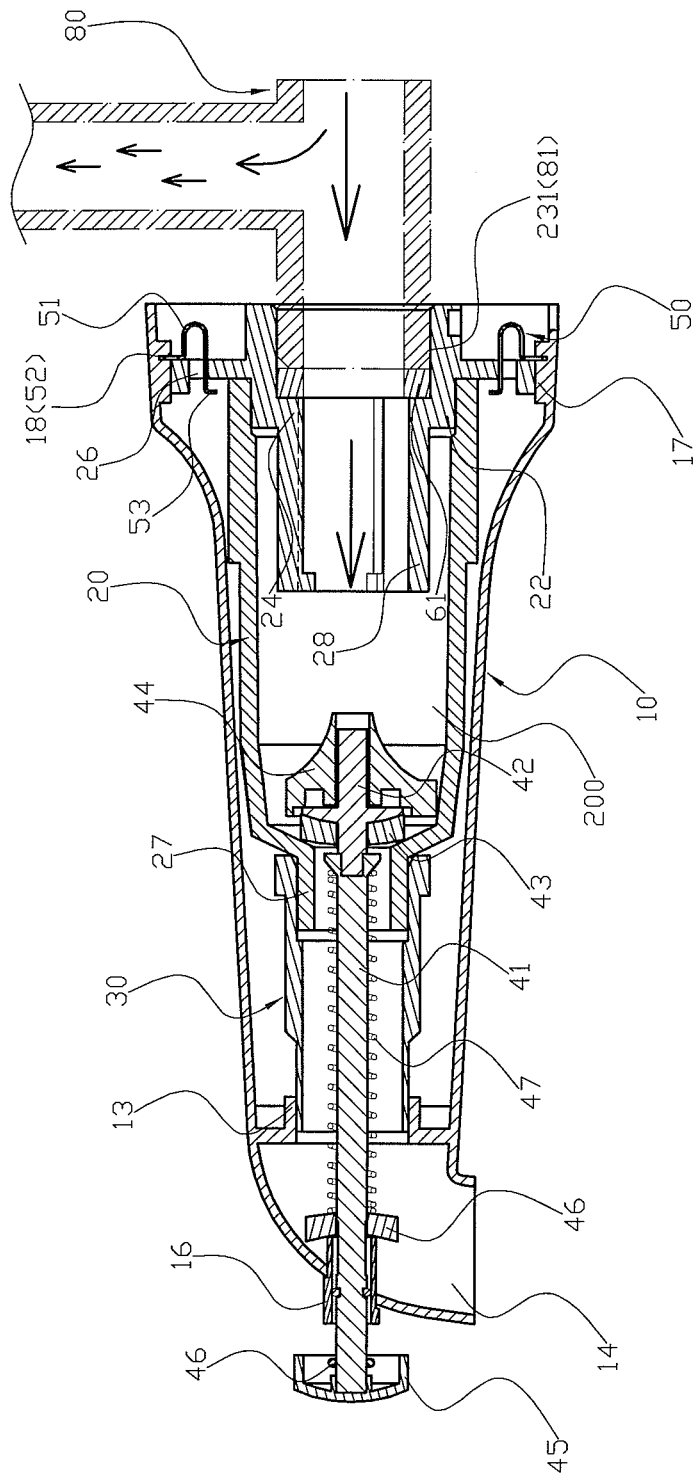
FIG. 7 is a schematic operational view of the faucet as shown in FIG. 6.

In operation, referring to FIGS. 6 and 7 with reference to FIGS. 1-5, the water from the water supply line 80 in turn flows through the mounting sleeve 22 of the disk 21, the compartment 200 of the connecting member 20, the mounting tube 27 of the connecting member 20, the extension sleeve 30 and the conduit 13 of the faucet body 10 into the outlet port 14 of the faucet body 10 as shown in FIG. 6 and then flows outward from the outlet port 14 of the faucet body 10 for use with a user. At this time, the O-rings 46 are biased between the water-tight gasket 16 and the valve shaft 41, and the water-tight gasket 16 is biased between the through hole 15 of the faucet body 10 and the valve shaft 41 of the control valve 40 to provide a sealing effect so as to prevent the water from flowing along the valve shaft 41 of the control valve 40 and the through hole 15 of the faucet body 10.

When the pull knob 45 is pulled outward, the valve shaft 41 of the control valve 40 is moved outward, and the sealing ring 43 is moved to seal the mounting tube 27 of the connecting member 20 as shown in FIG. 7 to interrupt the connection between the connecting member 20 and the outlet port 14 of the faucet body 10 so as to stop the water flow from the outlet port 14 of the faucet body 10. In such a manner, the water from the water supply line 80 is forced to flow upward to a shower head and is injected outward from the shower head for use with the user. At this time, the spring 47 is compressed by the water pressure in the compartment 200 of the connecting member 20 so that the valve shaft 41 of the control valve 40 will not be moved backward by the elastic force of the spring 47.

After the water from the water supply line 80 is stopped, the water pressure in the compartment 200 of the connecting member 20 is smaller than the elastic force of the spring 47 so that the valve shaft 41 of the control valve 40 is moved backward by the restoring force of the spring 47, and the sealing ring 43 is moved backward to detach from the mounting tube 27 of the connecting member 20 as shown in FIG. 4 to connect the connecting member 20 to the outlet port 14 of the faucet body 10 again.

Accordingly, the connecting member 20 is connected with the water supply line 80 by the first connector 60 or the second connector 70 so that the faucet is available for water supply lines of different types and sizes to enhance the versatility and compatibility of the faucet. In addition, the connecting member 20 is combined with the faucet body 10 by elastic connection of the elastic plates 50 so that the connecting member 20 is repaired and replaced easily and quickly. Further, the water-tight gasket 16 is biased between the through hole 15 of the faucet body 10 and the valve shaft 41 of the control valve 40, and the O-rings 46 are biased between the water-tight gasket 16 and the valve shaft 41, so that the water-tight gasket 16 co-operates with the O-rings 46 to provide a sealing effect so as to prevent the water from flowing along and leaking from the valve shaft 41 of the control valve 40 and the through hole 15 of the faucet body 10. Further, the extension sleeve 30 is connected with the connecting member 20 to fit the length of the faucet body 10 so that the connecting member 20 is combined with the faucet body 10 easily and quickly by connection of the extension sleeve 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A faucet, comprising:
a faucet body;
a connecting member mounted in the faucet body;
a control valve mounted between the faucet body and the connecting member;
a plurality of elastic plates each connected between the faucet body and the connecting member;
a first connector and a second connector connected with the connecting member separately;
wherein the faucet body has an inner portion provided with a receiving chamber;
the faucet body has a first end provided with an opening, a mediate portion provided with a conduit and a second end provided with an outlet port and a through hole;
the connecting member is received in the receiving chamber of the faucet body;
the connecting member has a first end connected with a disk which is located in the opening of the faucet body to seal the opening of the faucet body;
the disk is provided with a mounting sleeve;
the mounting sleeve of the disk has an inner portion provided with a mounting hole;
the connecting member has a second end provided with a reduced mounting tube which is connected with an extension sleeve which is connected with the conduit of the faucet body;
the first connector is removably mounted in the mounting hole of the mounting sleeve;
the second connector is removably mounted in the mounting hole of the mounting sleeve;
the receiving chamber of the faucet body is connected between the opening and the conduit of the faucet body;
the conduit of the faucet body is connected between the receiving chamber and the outlet port of the faucet body and between the receiving chamber and the through hole of the faucet body;
the through hole of the faucet body is connected to the outlet port and the conduit of the faucet body;
the water-tight gasket has a first end extended into the faucet body and a second end protruded outward from the through hole of the faucet body;
the mounting sleeve of the disk has a first end protruded from a first side of the disk and inserted into the con- necting member and a second end protruded from a second side of the disk and exposed from the opening of the faucet body;

the connecting member has an inner portion provided with a compartment connected between the mounting hole of the mounting sleeve and the mounting tube.

2. The faucet of claim 1, wherein the extension sleeve is received in the receiving chamber of the faucet body.

3. The faucet of claim 1, wherein the extension sleeve is connected between the mounting tube of the connecting member and the conduit of the faucet body.

4. The faucet of claim 3, wherein the extension sleeve has a first end mounted on the mounting tube of the connecting member and a second end inserted into the conduit of the faucet body;

the extension sleeve is connected with the connecting member to fit the length of the faucet body.

5. The faucet of claim 1, wherein the receiving chamber of the faucet body has a peripheral wall provided with a plurality of retaining blocks;

each of the retaining blocks of the faucet body is located beside the opening of the faucet body and has a face provided with a locking slit;

the faucet further comprises a water-tight gasket mounted in the through hole of the faucet body;

the disk has a periphery provided with a plurality of retaining recesses locked onto the retaining blocks of the faucet body respectively;

the disk has a surface provided with a plurality of elongate retaining slots aligning with the retaining recesses;

the control valve includes:

a valve shaft movably mounted in the water-tight gasket and having a first end extended into the connecting member and a second end protruded outward from the water-tight gasket;

a plurality of O-rings each mounted between the water-tight gasket and the valve shaft;

each of the elastic plates has a substantially U-shaped elastic portion which has a first side provided with a first locking blade snapped into and locked in the locking slit of a respective one of the retaining blocks of the faucet body and has a second side provided with a second locking blade hooked in a respective one of the retaining slots of the disk of the connecting member;

each of the elastic plates is biased between the faucet body and the connecting member to combine the faucet body and the connecting member.

6. The faucet of claim 5, wherein the water-tight gasket is biased between the through hole of the faucet body and the valve shaft of the control valve;

the valve shaft of the control valve extends through the conduit of the faucet body, the extension sleeve and the mounting tube of the connecting member into the connecting member.

7. The faucet of claim 5, wherein
the control valve further includes:

a valve seat mounted on the first end of the valve shaft;

a sealing ring mounted on the valve seat and movable to seal the mounting tube of the connecting member;

an end stop mounted on the valve seat;

a spring mounted on the valve shaft and biased between the water-tight gasket and the first end of the valve shaft to push the sealing ring away from the mounting tube of the connecting member;

a pull knob mounted on the second end of the valve shaft to pull the sealing ring toward the mounting tube of the connecting member;

the sealing ring and the end stop of the control valve are located at two opposite sides of the valve seat.

8. The faucet of claim 5, wherein the second locking blade of each of the elastic plates has a length greater than that of the first locking blade.

9. The faucet of claim 1, wherein the first connector has an inner portion provided with a mounting bore;

the first connector has a peripheral wall provided with a screw bore connected to the mounting bore of the first connector;

the faucet further comprises a threaded pressing member screwed into the screw bore of the first connector and extended into the mounting bore of the first connector.

10. The faucet of claim 9, wherein the faucet further comprises a leakproof ring mounted in the mounting bore of the first connector.

11. The faucet of claim 1, wherein the mounting hole of the mounting sleeve has a peripheral wall provided with an internal thread;

the first connector has an outer wall provided with an external thread screwed into the internal thread of the mounting sleeve;

the second connector has an outer wall provided with an external thread screwed into the internal thread of the mounting sleeve.

12. The faucet of claim 1, wherein the second connector has an inner wall provided with an inner threaded portion;

the second connector has an end portion provided with a plurality of tool slots.

13. The faucet of claim 1, wherein the mounting hole of the mounting sleeve has a distal end provided with a reduced stop flange;

the faucet further comprises a spacer mounted in the mounting hole of the mounting sleeve and located between the stop flange of the mounting sleeve and the first connector or the second connector.

14. The faucet of claim 1, wherein the mounting sleeve has a periphery provided with an extension pipe which is extended into the compartment of the connecting member.

15. The faucet of claim 14, wherein the extension pipe has an inner wall provided with a plurality of engaging ribs.

* * * * *